B. W. FELTHOUSEN.
Pumps.
No. 5,832. Reissued April 14, 1874.
Fig. 1.
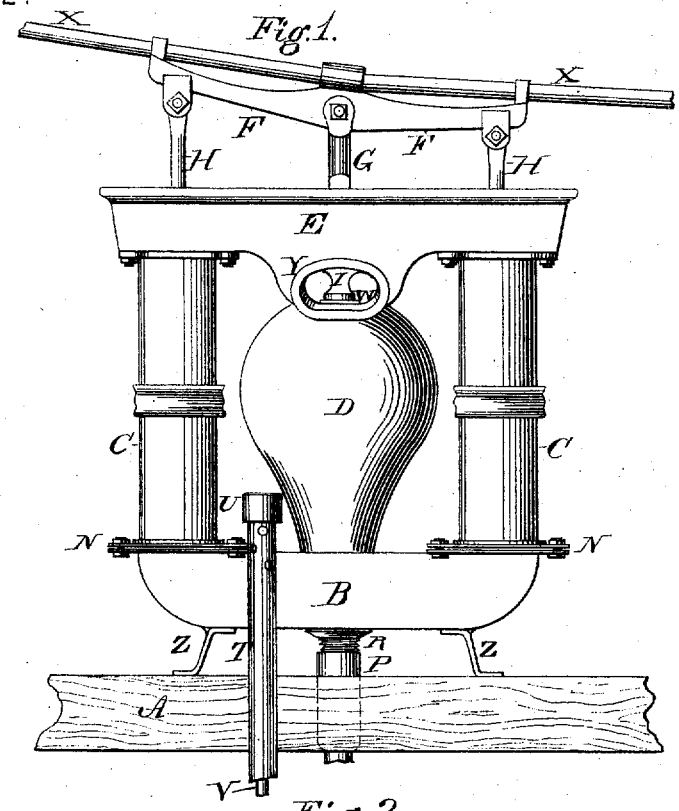
Fig. 2.
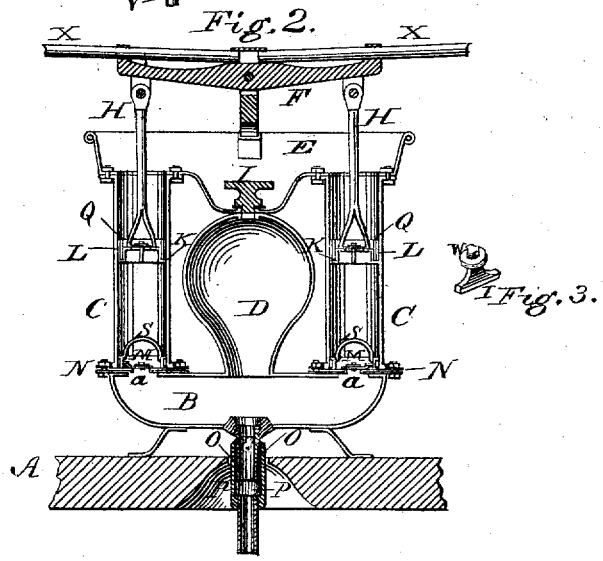
Fig. 3.
WITNESSES
H. H. Dodge
W. E. Chaffee
By
INVENTOR
B. W. Felthousen
Dodge & Son Attorneys.
AM. PHOTO-LITHOGRAPHIC Co. N. Y. (OSBORNE'S PROCESS.)

UNITED STATES PATENT OFFICE.

BARRENT W. FELTHOUSEN, OF MILWAUKEE, WISCONSIN.

IMPROVEMENT IN PUMPS.

Specification forming part of Letters Patent No. 103,435, dated May 24, 1870; reissue No. 5,832, dated April 14, 1874; application filed February 17, 1874.

*To all whom it may concern:*

Be it known that I, BARRENT W. FELTHOUSEN, of Milwaukee, in the county of Milwaukee and State of Wisconsin, have invented certain new and useful Improvements in Lift-Pumps; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention I will proceed to describe it.

My invention relates to lift-pumps of that class which have two vertical cylinders, with their plungers or pistons connected to opposite ends of a vibrating beam, and which are intended more especially for use on shipboard.

The invention consists in the use of a descending tube, and a rod suspended therein, the former to admit air to the hold of the vessel, and the latter to gage the depth of the water therein; and in arranging in connection with the two cylinders a single air-chamber, in such manner that, while it has a free unobstructed inlet, the air contained in it serves to cushion the water raised at each and every stroke of the pump.

Figure 1 is a side elevation of my pump. Fig. 2 is a vertical central section of the same. Fig. 3 is a perspective view of the plug or cock closing the top of the air-chamber.

A represents the base or support upon which the pump is secured, it being in the present instance the deck of a vessel. B is a water-chamber forming the lower portion or base of the pump, into which all the water is drawn before passing into the pump-cylinders or through any valves. C C are the pump-cylinders, having their lower flanged ends bolted fast upon the respective ends of the chamber B, which is provided in its top with two openings, *a*, into the cylinders, as shown in Fig. 2. A copper ring or bushing, N, is inserted between the lower ends of the cylinders and the top of the chamber B, as shown in Figs. 1 and 2, to form seats for the lower valves, which are made of leather, as hereinafter described. The copper bushing prevents the leather valves from coming in contact with the rusted iron surface, by which contact they would be rendered stiff and brittle. D is an air-chamber mounted on, and communicating with, the water-chamber B between the two pump-cylinders. This chamber has, it will be observed, a very large mouth or inlet which opens directly into the chamber B, as shown in Fig. 2, there being no valves, partitions, circuitous passages, or obstructions of any kind whatever between the water-chamber B and the interior of the air-chamber.

In the present instance, the air-chamber is directly over or above the inlet or feed pipe, which enters the bottom of the water-chamber B, so that the course of the incoming water is directly toward the mouth of the air-chamber. In every case the water-inlet and the air-chamber should be as near each other as convenient, and the air-chamber and the water-inlet should be equidistant from the two cylinders to render the action of the pump uniform.

E is a water-basin secured to the upper ends of the cylinders to receive the water raised therein. It is provided on one side with a spout or mouth, Y, through which the water escapes. F is a vibrating beam, to which the plunger-rods are attached, pivoted at its middle to a standard, G, as shown in Figs. 1 and 2. H H are the plunger or lifting valve-rods suspended from the ends of the beam F, and extending down into the cylinders C, as shown. K K are the lifting plungers or pistons attached to the lower ends of the rods H, and consisting each of a short tube or ring provided with a leather flap-valve, as usual. Each plunger is surrounded by a wide leather packing-ring, L, and is provided inside of said packing with a wide copper ring, Q, to support the packing and keep it in place. Copper is used, for the reason that it will not rust and injure the leather packing. M M are the lower and stationary valves mounted in the foot of the cylinders, and consisting each of a metal ring provided with a leather flap, which shuts down upon the copper bushing N, over the opening *a*, as shown in Fig. 2. Each valve is provided with a bail or handle, S, by which it may be drawn up out of the cylinder when necessary. O is an air-chamber in the feed or lift pipe, for the purpose of easing the water when the pump is in motion. This chamber is formed by severing or breaking the continuity of the feed-pipe R, and then securing around its two parts a larger pipe or cylinder, P, in the manner shown in Fig. 2. T is an outside pipe, extending from the pump downward into the hold of the vessel to admit air in place of the water pumped out. The air enters the pipe through perforations in its sides, at the upper end, as shown in Fig. 1. A cap, U, is screwed upon the upper end of the pipe, and a rod, V, secured to the cap in such manner as to hang down within the tube. Upon unscrewing the cap and drawing up the rod the depth of water in the hold can be seen by the height to which the rod is wet.

The pump is set in operation by giving the beam a vibratory motion by means of its handles or brakes, so as to carry the plungers up and down in their cylinders. The water is drawn through the pipe into the chamber B, and thence through the valves into the cylinders C, from which it is lifted by the plungers into the trough, which discharges it through the spout.

It will be noticed that all the water entering the pump passes into the chamber B, which is provided with the air-chamber, before passing into the pump-cylinders or passing through any valves; that there is free, clear, and unobstructed communication between the feed or supply pipe and the air-chamber D; and that there is nothing whatever to impede or check the water in its passage into and out of the air-chamber D. It will be seen that by placing the air-chamber between the two cylinders it is made to answer for them both. In consequence of this construction the water rushing through the feed-pipe into the chamber B at each stroke of the pump is allowed to cushion with full force and effect upon the air in the chamber D. As the air-chamber is at the middle, between the cylinders, the incoming water cushions at once instead of first traveling a lengthy or circuitous route. All jar and concussion are thus prevented, the pump rendered easy of operation, and a very regular, uniform stream delivered.

The arrangement of the air-chamber in the manner shown and described also renders the pump very simple and cheap, and avoids the liability of the chamber having its mouth or entrance impeded by chips or other foreign matters contained in the water.

I am aware that air-chambers have been used on double-cylinder pumps in many different ways; but so far as I am aware my present pump is the first in which the single air-chamber, answering for both cylinders, has a free, clear, and unobstructed opening or inlet, without valves or other parts to obstruct the water in its passage into the air-chamber.

I claim—

1. The pipe T, cap U, and rod V, combined and arranged substantially as shown, and for the purpose set forth.

2. A double-cylinder lifting-pump, having an air-chamber, D, with a free unobstructed inlet mounted between the cylinders, substantially as shown, so that the air in said chamber forms a cushion for the ascending water at each stroke of the pump.

3. The double-cylinder lift-pump, having both cylinders connected to the water space or chamber B, provided with the air-chamber D, having free and unobstructed communication therewith, midway between the cylinders, as shown, so that it serves to cushion the water raised by the plungers of both cylinders.

4. In combination with the receiving-chamber B, having the feed or supply pipe connected to its middle, and the two cylinders mounted on its ends and provided with the valves M and plunger H K, the single air-chamber D, having a free unobstructed communication with the chamber B midway between the cylinders.

BARRENT W. FELTHOUSEN.

Witnesses:

H. H. MARKHAM,

C. E. KREMER.